May 22, 1945.  J. P. WHANN  2,376,408
VEGETABLE CUTTER
Filed March 6, 1941  2 Sheets-Sheet 1

INVENTOR.
Jesse P. Whann

May 22, 1945. J. P. WHANN 2,376,408
VEGETABLE CUTTER
Filed March 6, 1941 2 Sheets-Sheet 2
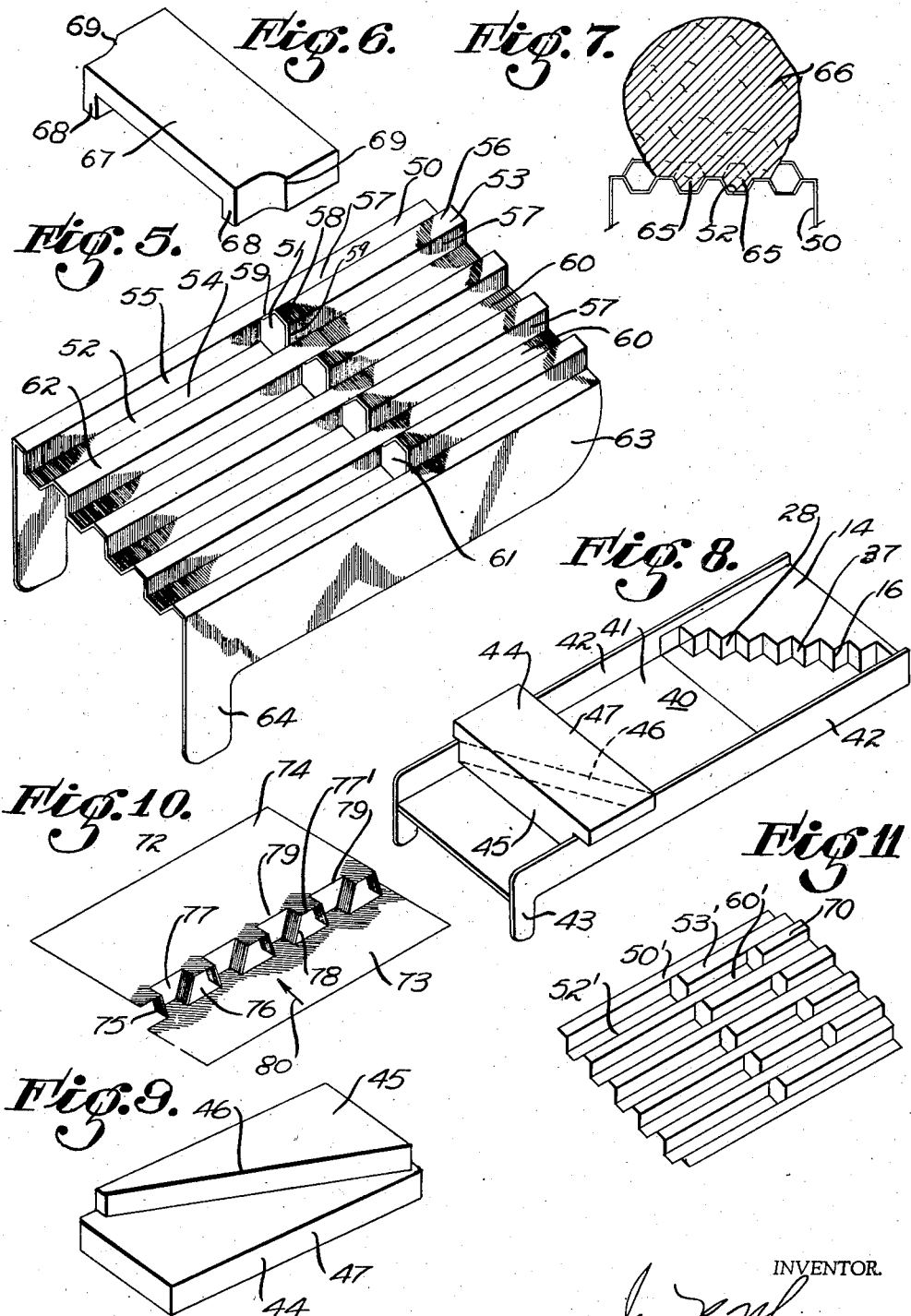
INVENTOR.
Jesse P. Whann Patented May 22, 1945

2,376,408

UNITED STATES PATENT OFFICE 2,376,408

VEGETABLE CUTTER

Jesse P. Whann, Los Angeles, Calif.

Application March 6, 1941, Serial No. 382,043

11 Claims. (Cl. 146—170)

My invention relates to a simple form of device for cutting vegetables into strips, for example, cutting potatoes into strips for French fries.

It is an object of the invention to provide a cutter of this character which may be readily formed from a single sheet of metal and which will be relatively easy of operation by reason of the manner in which the cutting edges are formed and positioned.

It is an object of the invention to provide a cutter which will cut a plurality of strips at one time, or with a single movement of the cutter relative to the vegetable, wherein the force to accomplish the cutting action is minimized by reason of the placement of the cutting edges so that the strips are not laterally compressed as occurs where the strips must pass between a pair of spaced substantially parallel cutting edges or blades.

A further object is to provide a cutter of the character described formed from a sheet having slots placed in overlapping or staggered relation so as to form cutting blade portions between the slots, which cutting blade portions are moved into perpendicular position relative to the remaining portion of the sheet of metal by bending the sheet at the extremities of the slots upwardly and downwardly along prescribed lines. In one form of construction described, the cutting blades are so disposed that no two of them lie in face to face relation and in another form the cutting blade portions are in such non-parallel relation that clearance for the cut strips is provided.

An object of the invention is to provide a cutter for cutting strips having a plurality of cutting edges arranged so that a plurality of hexagonal strips are simultaneously cut.

A further object of the invention is to provide a cutter for simultaneously cutting a plurality of strips from a vegetable, this cutter having the cutting edges thereof so placed that the strips may deflect laterally as they pass the cutting edges, and therefore are not placed under compression, as is necessary in those cutters wherein the vegetable is forced through openings formed by the cutting blades, which openings are of smaller cross sectional area than the strips cut by the blade.

A further object of the invention is to provide a simple form of strip cutter of the character hereinbefore set forth, which may be readily incorporated in the handle of a kitchen tool, such as a peeler.

Further objects and advantages of the invention will be brought out in the following part of the specification.

Referring to the drawings, which are for illustrative purposes only:

Fig. 5 is a perspective view of an alternative form of my invention by which the strips cut are given hexagonal form.

Fig. 6 is a perspective view of a pusher adapted to be used in conjunction with the device shown in Fig. 5.

Fig. 7 is a schematic sectional view showing the manner in which the cutter shown in Fig. 5 cuts polygonal strips from a vegetable.

Fig. 8 is a perspective view showing a form of my cutter in a holder whereby it may be employed to cut larger quantities of potatoes.

Fig. 9 is a perspective view showing the bottom face of the pusher lock shown in Fig. 8.

Fig. 10 is a perspective view showing another form of my invention wherein the cutting blades, formed from a single sheet, lie in non-parallel relation.

Fig. 11 is a perspective view showing the manner in which a plate or sheet may be formed with successive strip cutting elements so that by one movement of the article to be cut relative to the device, a larger number of strips will be formed.

Figure 1:
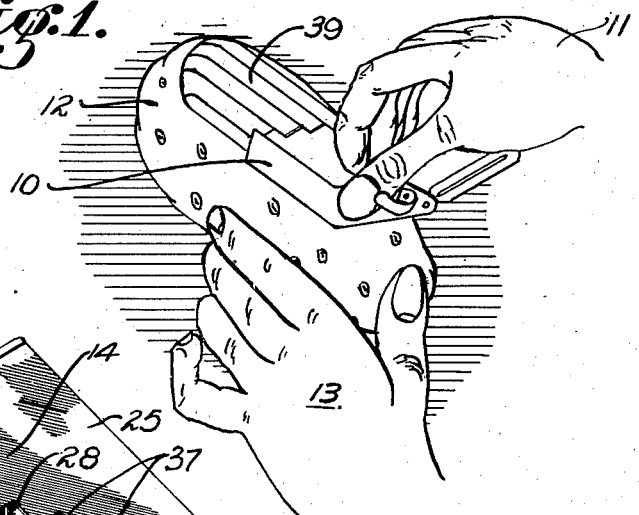
Fig. 1 is a perspective view showing a manner in which one form of my invention may be used.
Figure 2:
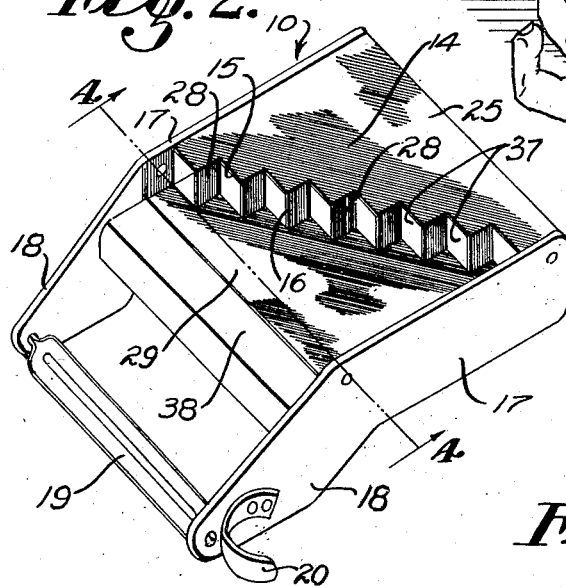
Fig. 2 is an enlarged perspective view of the device shown in Fig. 1, turned over so as to show the strip cutting elements.

In Fig. 1 I show a strip cutter 10, held in the right hand 11 of a user and being applied to a piece of potato 12 lying flat upon a surface such as a chopping board, this potato 12 being held against movement by the user's left hand 13. In Fig. 2 I show the strip cutter 10 turned over from the position in which it is shown in Fig. 1, to disclose the cutter element 14 and its horizontal and vertical cutting edges 15 and 16. The cutter element 14 is supported between a pair of side bars 17, which cooperate in forming a handle for the device 10, which handle may likewise support between the projecting portions 18 thereof, a rotatable peeler cutter 19 of the type disclosed in Patent No. 2,106,796. A gouge 20 is shown secured to one of the projections 18. When the device 10 is in the position in which it is shown in Fig. 2, it may be employed to peel a vegetable in the manner disclosed in the above identified patent. Then, after the potato is peeled, the device 10 may be inverted and drawn across the peeled potato so as to rapidly cut the same into strips for French frying.

Figure 3:
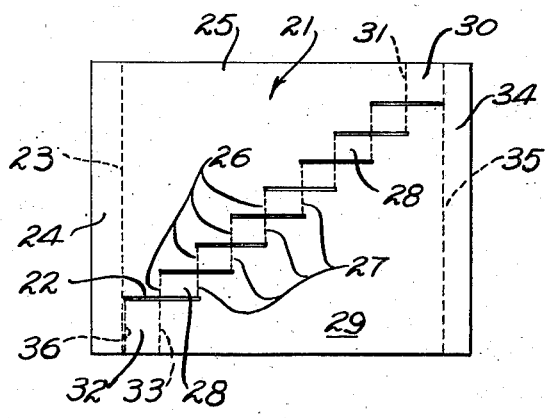
Fig. 3 is a face view of a sheet of metal from which the strip cutter is formed, showing the slits in the sheet prior to the bending of the sheet.

In Fig. 3 I show a flat thin metal plate 21 having a plurality of slits 22 cut therein in spaced relation but staggered progressively from left to right and rearwardly so that the leftward end of the second slit will overlap the rightward end of the first slit, and the leftward end of the third slit will overlap the rightward end of the second slit, etc. Near the leftward end of the sheet 21 a dotted line 23 defines a strip 24 which is to be bent downward into a vertical plane relative to the rear section 25 of the sheet 21. From the leftward end of the second slit 22 and from the leftward end of each succeeding slit 22, a dotted line 26 is extended forward to the intermediate portion of the preceding slit, and from the rightward ends of the first to the seventh slits 22 dotted lines 27 are extended rearward. Between each dotted line 26 and the dotted line 27 adjacent thereto there is a rectangular area of metal which may be referred to as a cutting blade portion 28. In the formation of the cutter element 14, each blade portion 28 is bent downward along a line 26 relative to the rear section 25 of the sheet 21, and is bent upward along a line 27 relative to the front section 29 of the sheet 21. At the same time, the area 30 of the rear section 25 will be bent downward along the dotted line 31, and the area 32 of the front section 29 will be bent upward along the dotted line 33. The strip 34 at the right side of the sheet 21 will be bent upward along the dotted line 35 so as to lie in a vertical plane. The area 32 will also be bent downward along the dotted line 36 so that the area 32 will lie in face to face relation to the front end of the strip 24 as shown in Fig. 4.

Figure 4:
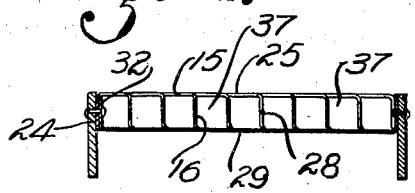
Fig. 4 is a section taken as indicated by the line 4—4 of Fig. 2.

When the sheet 21 is bent in the manner described in the preceding paragraph, the cutter blade portions 28 will be swung into vertical plane and the front section 29 of the sheet 21 will lie in a horizontal plane faced below the horizontal plane defined by the rear section 25, as shown in Figs. 2 and 4. From Fig. 2, it will be noted that although the cutting blade portions 28 lie in parallel vertical plane, these cutting blade portions 28 are not in face to face relation, but each succeeding cutting blade portion 28 is offset rearward from each preceding cutting blade portion 28. Each of these portions 28 has a cutting edge 16 at its forward edge along the front edge of the rear section 25 the cooperating horizontal cutting edges 15 are formed. As shown in Figs. 2 and 4, the cooperating cutting edges 15 and 16 define above the plane of the front section 29 a quadrilateral opening 37. Whether these openings 37 are square or rhomboidal, will depend upon whether the blade portions 28 are bent into vertical or sloping planes.

In describing the operation of the strip cutter, let it be assumed that the article to be cut, for example, a potato, is placed on the upper surface of the section 29 and the cross brace 38, ahead of the cutting edges 15 and 16, and is then moved rearward so as to engage and then pass beyond the cutting edges, each pair of cooperating edges 15 and 16 will cut a strip from the lower portion of the potato, and as each strip is cut, it may bend leftward and downward, since there is no metal wall below the forward portion of the upper section 25, and there are no metal walls lying opposite the leftward faces of the blade portions 28. Accordingly, as the strips pass the cutting edges 15 and 16, they are immediately given clearance so that there is no binding action whatsoever and the only resistance to the rearward movement of the potato through the strip cutting action is due to the actual cutting, without any frictional resistance such as occasioned in many strip cutting devices by the necessity of forcing the strips between parallel or faced walls so that the strips are laterally compressed. As shown in Fig. 1, the potato may be cut in half, and the half may be placed upon a flat surface such as a board, as indicated in 12 in Fig. 1. Then the device 10, in a position inverted from that in which it is shown in Fig. 2 may be drawn lengthwise across the upper surface of the potato from front to rear. At each cutting stroke thereof a plurality of strips 39 will be cut from the upper portion of the potato. I find that it is possible to cut the potato in strips right down to the surface of the board on which it is placed, for the reason that even though the potato may be quite thin, the cutter may be started from the front end and drawn to an intermediate position, while the left hand is holding the rear end of the potato, and then the left hand may be transferred to the front end of the potato to hold the same while the stroke of the device 10 is completed.

In Fig. 8 I show a cutter 14, of the type disclosed in Figs. 1 to 4, mounted at the rear end of a channel 40 comprising a bottom wall 41 and side walls 42 having toes or hooks 43 at the front ends thereof which may be hooked over the edge of a table or other object. A pusher block 44 slides along the channel 40. The article to be cut into strips may be placed on the bottom wall 41 of the channel 40 between the pusher block 44 and the cutter 14, and then by rearward movement of the pusher bock, the article may be forced into engagement and then past the cutter 14. At each stroke of the article in rearward direction, a plurality of strips will be cut from the lower portion thereof, the number of strokes required to reduce the article to strips depending upon the vertical height of the openings 37 of the cutter as compared to the vertical thickness of the article which is to be cut into strips.

In Fig. 9 I show how the lower portion 45 of the block 44, which extends down into the channel between the side walls 42 may be cut off at an angle as shown in 46, corresponding to the angular line defined by the vertical edges 16 of the cutter 14, so that the forward portion 47 of the upper part of the block 44 may pass beyond the cutting edges of the cutter 14.

In Fig. 5 I show an alternative form of my invention wherein a metal sheet 50 has transverse slits 51 cut therein, after which, or in conjunction with which, longitudinal portions of the sheet 50 ahead of the slits are bent or displaced downward so as to form a channel, and longitudinal portions of the sheet 50 lying to the rear of the slits 51 are pressed upward to form ridges 53. The channels 52 each have a bottom wall 54 and side walls 55 which are flared upwardly for clearance, as will be hereinafter described. The ridges 53 each have a top wall 56 and side walls 57. The front ends of the top walls 56 and the side walls 57 respectively form cutting edges 58 and 59.

Between the ridges 53 grooves 60 are formed. The cross sectional areas of these grooves should approximate the cross sectional areas of the channels 52, and preferably the cross sectional areas of the ridges 53 should each constitute the upper half of an approximately polygonal area, such as the upper half of a hexagon, as shown in Fig. 5, and the cross sectional area of each channel 52 should be complementary to the cross sectional area of the ridge 53 lying therebehind. For example, in Fig. 5 I have shown each channel 52 as having a cross sectional area constituting the lower half of a hexagon, with the result that when the cutter shown in Fig. 5 is viewed from the front end thereof, the walls of the channel 52 and of the ridges 53 will define hexagonal openings 61. Between the channels 52 there are horizontal walls 62 which extend into and form the bottoms of the grooves 60. Each of these horizontal walls 62 preferably has a width equal to the width of the walls 54 and 56. Edge portions 63 of the sheet 50 may be bent downward to provide vertical walls to rest upon a table surface, and toes 64 to engage an end wall whereby movement of the strip cutter will be resisted. When the article to be cut, for example, a potato, is first applied to the cutter, its lower face will engage the walls 62 ahead of the cutting edges 58 and 59. Then, when the potato is moved rearward, the cutting edges 58 and 59 will cut strips therein, each strip having a cross section approximating a half of a hexagon. Between the grooves cut by the cutting edges 58 and 59 there will be a plurality of ribs such as shown at 65 in Fig. 7. When the potato is moved back onto the front end of the cutter, these ribs 65 will drop into the channels 52 and as the potato 66, Fig. 7, is moved rearward, the channels 52 will guide the ridges 65 to the hexagonal openings 61 defined by the cutting edges 58 and 59, with the result that the ridges 65 and adjacent portions of the potato 66 will be removed, and the strips thus cut from the potato 66 will be hexagonal in area. Each cutting stroke of the potato 66 will leave on the lower face thereof ridges 65 which will be engaged with the channels 52 prior to and during the next cutting stroke. In Fig. 6 I show a pusher 67 adapted to slide on the front portion of the cutter shown in Fig. 5, to push the potato through its cutting stroke. This pusher 67 has flanges 68 to project downward outside the side walls 63 of the cutter to serve as guides, and the pusher may be provided with shoulders 69 for manual engagement.

As shown in Fig. 11, the cutter is especially adapted for use as a quick cutting shredder. In Fig. 11 I show a plate 50', similar to the plate 50 of Fig. 5, bent or formed so as to provide a plurality of channels 52' leading to openings at the front end of the ridges 53'. At the rear ends of the grooves 60', formed between the ridges 53', a succeeding set of ridges 70, of the same character as the ridges 53 shown in Fig. 5, may be formed, ad infinitum. It will be understood that the sizes of the channels 52' and ribs 53' and 70 may be varied in accordance with the size of the strips to be cut, and that they may be made very small in size to cut fine thin shreds of polygonal cross sections. The vegetable to be shredded will be placed on the front portion of the cutter shown in Fig. 11 and will then be moved rearward. As it passes the front end of the ridges 53 strips will be cut therefrom and ridges left by the cutting of these strips will be guided by the grooves 60' into engagement with the cutting edges formed at the front ends of the ridges 70'. A feature of this cutter is that the channels or grooves between the ridges definitely guide the article which is being shredded so that there is no sideward movement and a complete cutting action is produced at each rearward stroke of the article relative to the cutter. Likewise the strips or shreds produced will be of uniform size.

In Fig. 10 I show another form of my invention wherein a single metal sheet 72 is stamped or formed so as to provide a downwardly displaced or offset front section 73 and a rear section 74 with integrally formed cutting blade portions 75 connecting the rear edge of the front portion and the front edge of the rear portion 74, thereby defining a plurality of front openings 76 and a plurality of rear openings 77. Above the plane of the front portion 73 of the sheet 72 the front openings 76 are defined by horizontal cutting edges 77' and downwardly diverging cutting edges 78, and the rear openings 77 have their upper limits defined by horizontal cutting edges 79. When a potato, or other article, is moved across the surface of the front portion 73 in the direction of the arrow 80, the cutting edges 77' and 78 will cut strips therefrom, which strips may deflect downwardly, and thereafter the ridges formed between the cutting edges 78 will be cut off from the potato by the cutting edges 79, to form strips which will pass through the openings 77. It will be perceived that at each cutting stroke a complete layer will be removed from the bottom of the potato, the thickness of this layer being determined by the vertical height of the openings 76 and 77, and this layer will be divided into strips of keystone cross sections.

I claim as my invention:

1. In a strip cutting device of the character described, the combination of: a front plate portion and a rear plate portion lying in spaced planes, with the front edge of said rear plate portion spaced rearward from the front edge of said front plate portion; and a plurality of cutting members extending diagonally from the forward part of said rear plate portion to said front plate portion so as to form keystone shaped openings between the said forward part of said rear plate portion and said front plate portion.

2. A strip cutting device of the character described, comprising a sheet of relatively thin metal formed so as to provide front and rear plate portions lying in vertically spaced substantially parallel planes with the front edge of said rear plate portion adjacent and spaced upwardly from the rear edge of said front plate portion, and a plurality of webs extending from the front edge of said rear plate portion to the rear edge of said front plate portion, said webs being integral with said plate portions and the forward edges of said webs and of said rear plate portion constituting cutting edge to cut strips from an article moved relatively thereto.

3. A strip cutting device of the character described, comprising a sheet of relatively thin metal formed so as to provide front and rear plate portions lying in vertically spaced substantially parallel planes with the front edge of said rear plate portion adjacent and spaced upwardly from the rear edge of said front plate portion, and a plurality of webs extending from the front edge of said rear plate portion to the rear edge of said front plate portion, said webs being integral with said plate portions and the forward edges of said webs and of said rear plate portion constituting cutting edges to cut strips from an article moved relatively thereto, and each of said webs being offset from face to face relation to the webs adjacent thereto.

4. A strip cutting device of the character described comprising a sheet of relatively thin metal formed so as to provide front and rear plate portions lying in spaced substantially parallel planes with the front edge of said rear plate portion contiguous to the rear edge of said front plate portion and spaced therefrom, and a plurality of webs extending from the front edge of said rear plate portion to the rear edge of said front plate portion, said webs being integral with said plate portions and the forward edges of said webs and of said rear plate portion constituting cutting edges to cut strips from an article moved relatively thereto, said webs extending from said rear plate portion to said front plate portion so as to form keystone shaped openings.

5. A strip cutting device of the character described, comprising a single sheet of metal formed so as to provide a top with sides extending down from the edges of said top to engage a support, said top being formed so as to form a plurality of cutting edges arranged to cut strips from an article moved lengthwise along the upper face of said top, there being downwardly projecting hooks at the forward ends of said sides to engage a shoulder of said support, and thereby prevent forward movement of the device relatively to said support; and a block slidable along said top to force said article through a cutting operation.

6. In a strip cutting device of the character described, the combination of: a front plate portion and a rear plate portion lying in spaced planes, with the front edge of said rear plate portion spaced rearward from the front edge of said front plate portion; a plurality of cutting members extending from the forward part of said rear plate portion toward said front plate portion, the forward part of said rear plate portion having thereon forwardly presented cutting edges; walls extending down from the sides of said plate portions to provide rests to engage a support; and a block slidable along said front plate portion so as to force an article through a strip cutting operation.

7. A strip cutting device of the character described, the combination of: a sheet of metal formed so as to provide a front portion and a rear portion, the rear portion having wall means raised with relation to said front portion so as to lie in a plane spaced from but substantially parallel to the plane of said front portion, said metal sheet being shaped so as to form cutting edges at the front end of said rear portion to cut strips from an article moved relative to the upper face of said metal sheet and to define openings through which said strips may pass; and walls extending down from the edges of said sheet to engage a support, there being means for engagement with said support to prevent movement of said device during a cutting operation.

8. A blank from which to form a strip cutter of the character described, comprising a sheet of relatively thin material having a plurality of slots arranged along a diagonal line from one side of the sheet to the other so that the ends of said slots will lie in spaced relation to define webs which may be bent into angular relation to the remainder of the sheet.

9. A strip cutting device of the character described, comprising: a sheet formed so as to provide a front plate portion and a rear plate portion, the rear plate portion having its front edge adjacent to and spaced upwardly from the rear edge of said front plate portion, said front and rear edges of said plate portions having complementary steps formed therealong, each of which steps comprises a lateral edge and a longitudinal edge, and said sheet being so further formed as to provide strips extending downward from the longitudinal edges of the steps of said rear plate portion to the longitudinal edges of the steps of the front plate portion, whereby a plurality of adjacent openings will be defined by said strips between said front and rear edges of said plate portions.

10. A strip cutting device of the character described, comprising: a sheet formed so as to provide a front plate portion and a rear plate portion, the rear plate portion having its front edge adjacent to and spaced upwardly from the rear edge of said front plate portion, said front and rear edges of said plate portions being disposeed diagonally with respect to the line of movement of an article which is to be cut into strips and having complementary steps formed therealong, each of which steps comprises a lateral edge and a longitudinal edge, and said sheet being so further formed as to provide strips extending downward from the longitudinal edges of the steps of said rear plate portion to the longitudinal edges of the steps of the front plate portion, whereby a plurality of adjacent openings will be defined by said strips between said front and rear edges of said plate portions.

11. A strip cutting device of the character described, comprising: a front plate and a rear plate, the rear plate having its front edge adjacent to and spaced upwardly from the rear edge of said front plate, said front edge of said rear plate having complementary steps formed therealong, each of which steps comprises a lateral edge and a longitudinal edge, and knife-forming strips extending from the longitudinal edges of the steps of said rear plate to said front plate, whereby a plurality of adjacent openings are defined by said front and rear plates and said strips along a line diagonal with respect to the sides of the device.

JESSE P. WHANN.